United States Patent
Lahr

(10) Patent No.: US 7,104,715 B2
(45) Date of Patent: Sep. 12, 2006

(54) DEPLOYABLE KEYBOARD DEVICE INCLUDING DISPLACEABLE KEYBUTTON POSITIONS FOR PORTABLE MINIATURE ELECTRONIC DEVICES

(75) Inventor: Roy J. Lahr, Los Angeles, CA (US)

(73) Assignee: RAST Associates, LLC, Long Beach, CA (US)

( * ) Notice: Subject to any disclaimer, the term of this patent is extended or adjusted under 35 U.S.C. 154(b) by 9 days.

(21) Appl. No.: 10/925,237

(22) Filed: Aug. 23, 2004

(65) Prior Publication Data

US 2005/0042014 A1 Feb. 24, 2005

Related U.S. Application Data

(60) Provisional application No. 60/497,241, filed on Aug. 22, 2003, provisional application No. 60/548,644, filed on Feb. 26, 2004.

(51) Int. Cl.
*B41J 29/02* (2006.01)

(52) U.S. Cl. .......................... 400/693; 400/472

(58) Field of Classification Search ................ 400/472, 400/693, 691, 485, 692, 489, 491.2, 492; 341/21, 22; 361/680; 345/168–170
See application file for complete search history.

(56) References Cited

U.S. PATENT DOCUMENTS

| | | | |
|---|---|---|---|
| 5,008,864 A | 4/1991 | Yoshitake | 368/10 |
| 5,037,163 A | 8/1991 | Hatcher | 312/323 |
| 5,054,051 A | 10/1991 | Hoff | 455/556.1 |
| 5,141,343 A * | 8/1992 | Roylance et al. | 400/472 |
| 5,224,076 A | 6/1993 | Thorp | 368/10 |
| 5,251,189 A | 10/1993 | Thorp | 368/4 |
| 5,274,613 A | 12/1993 | Seager | 368/13 |
| 5,901,934 A | 5/1999 | Wilson | 248/346.01 |
| 6,155,841 A | 12/2000 | Spanyar | 439/37 |
| 6,184,804 B1 * | 2/2001 | Harrison | 341/22 |
| 6,271,835 B1 | 8/2001 | Hoeksma | 345/168 |
| 6,296,407 B1 * | 10/2001 | McKay et al. | 400/624 |
| 6,454,369 B1 | 9/2002 | Cooper et al. | 312/223.3 |
| 6,467,860 B1 | 10/2002 | Remmers | 312/334.7 |
| 6,487,421 B1 | 11/2002 | Hess et al. | 455/550.1 |
| 6,696,985 B1 * | 2/2004 | Houston | 341/21 |
| 6,739,774 B1 * | 5/2004 | Lahr | 400/495 |
| 6,861,961 B1 * | 3/2005 | Sandbach et al. | 341/22 |
| 2001/0038522 A1 * | 11/2001 | Zheng | 361/680 |
| 2003/0147205 A1 * | 8/2003 | Murphy | 361/680 |

\* cited by examiner

*Primary Examiner*—Anthony H. Nguyen
(74) *Attorney, Agent, or Firm*—Kenyon & Kenyon LLP

(57) ABSTRACT

In a miniature keyboard, keybuttons may shift their relative positions from a relatively smaller array when stored to deployment which results in a relatively larger array for active keyboard use. An application for this positional adjustment is the use of the keyboard for inputting data with fingertips when used with portable miniature electronic devices, e.g., small cellphones.

28 Claims, 7 Drawing Sheets

Micro Cellphone Keybutton Tops (or Keycaps)

Alphabetic legend ON keycap (enlarged from actual size)

Actual size keycap

Number on keybutton top plus alphabetic legend on stretched material

When stretched material relaxed for storage, legend shrinks.
But, keybutton top stays same size.

Micro Cellphone Keyboard Operation
(Shown Enlarged)

Two drawer Keyboard for micro cellphone

Side Views keyboard stored keyboard open (stairstep)

keyboard open (flat and level)

keyboard open (flat and angled)

Telescoping keyboard frame
lower section of frame unit

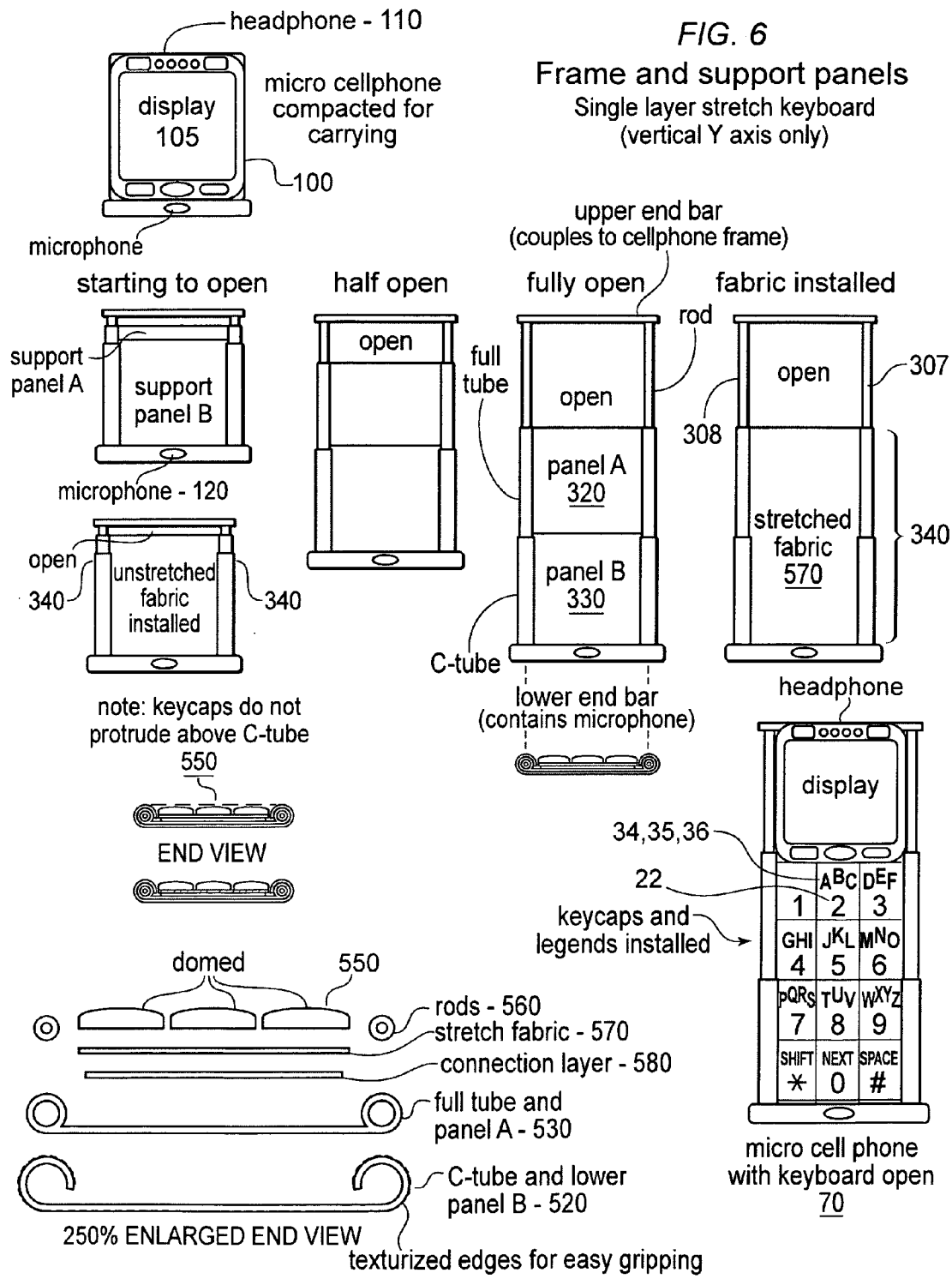

Stretch keyboard for cellphone
(greatly enlarged over actual size)
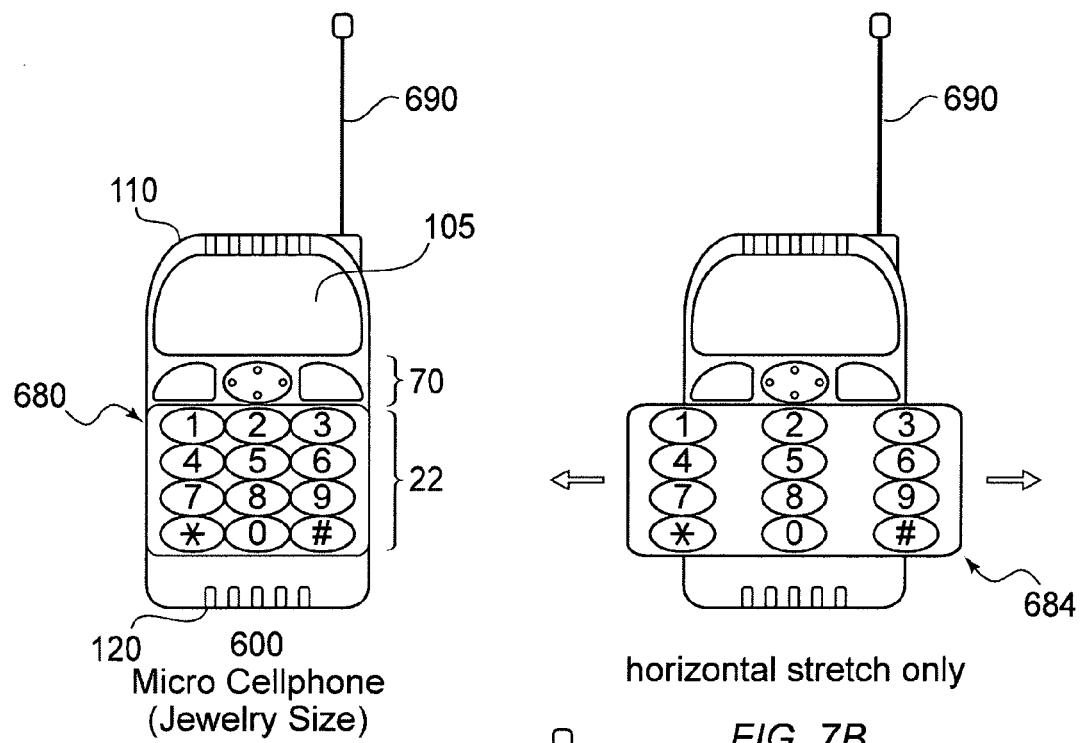
Micro Cellphone (Jewelry Size)
FIG. 7A
horizontal stretch only
FIG. 7B
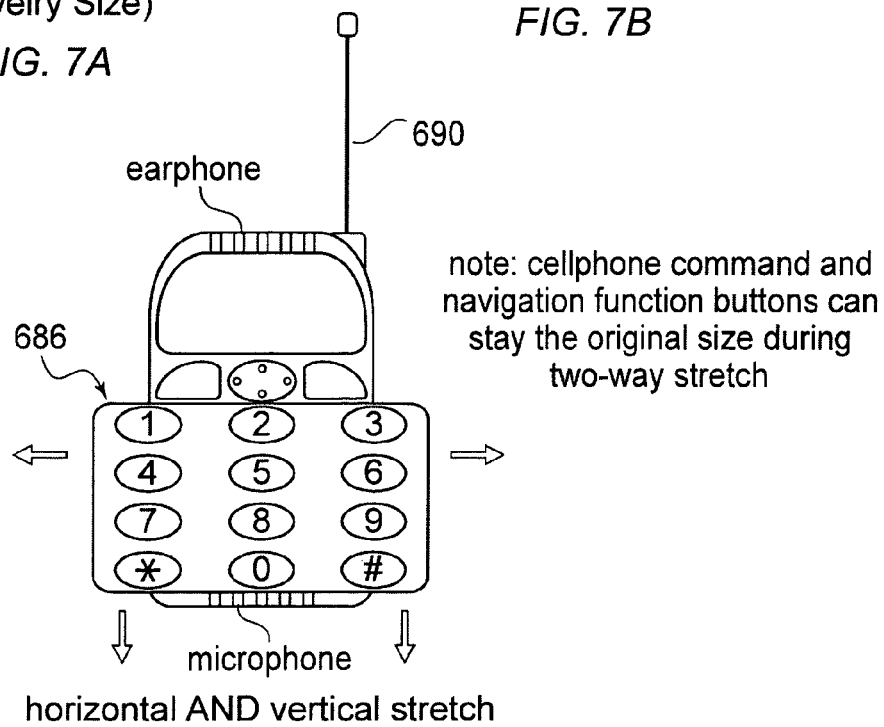
note: cellphone command and navigation function buttons can stay the original size during two-way stretch
horizontal AND vertical stretch
FIG. 7C

DEPLOYABLE KEYBOARD DEVICE INCLUDING DISPLACEABLE KEYBUTTON POSITIONS FOR PORTABLE MINIATURE ELECTRONIC DEVICES

CROSS-REFERENCE TO RELATED APPLICATIONS

The present application claims the benefit of U.S. Provisional Application No. 60/497,241, filed on Aug. 22, 2003, and U.S. Provisional Application No. 60/548,644, filed on Feb. 26, 2004, each of which is expressly incorporated herein in its entirety by reference thereto.

FIELD OF THE INVENTION

The present invention relates to a keyboard device. More particularly, the present invention relates to a deployable keyboard device that includes displaceable keybutton positions for, e.g., portable miniature electronic devices. In addition, the present invention relates to a keyboard which may be adjusted to vary the size of the keyboard, the size of the keycaps of the keyboard and the spacing between the keycaps.

BACKGROUND INFORMATION

Reference is made to: U.S. Pat. No. 5,008,864 to Yoshitake, U.S. Pat. No. 5,037,163 to Hatcher, U.S. Pat. No. 5,054,051 to Hoff, U.S. Pat. No. 5,224,076 to Thorp, U.S. Pat. No. 5,251,189 to Thorp, U.S. Pat. No. 5,274,613 to Seager, U.S. Pat. No. 5,901,934 to Wilson, U.S. Pat. No. 6,155,841 to Spanyar, U.S. Pat. No. 6,271,835 to Hoeksma, U.S. Pat. No. 6,454,369 to Cooper et al., U.S. Pat. No. 6,467,860 to Remmers and U.S. Pat. No. 6,487,421 to Hess et al.

Advances in miniaturization technology may permit wristwatch-sized cellphones. These miniature cellphones may be detachably worn on the wrist, serving as timepieces between cellphone calls, or alternately carried in the pocket as separate instruments. They may even be worn on the surface of clothing, pendant style. As a generic label for these ultra small "postage stamp size" communication devices, they will be termed "micro cellphones" in the following text.

When the entire micro cellphone is the size of a wrist watch, or slightly smaller (postage stamp size), the design of the data input keyboard is challenging. A very small keyboard may be operated by the tip of a stylus, but this is not a convenient operation for the user. In this regard, reference is made to U.S. Pat. No. 6,487,421 to Hess et al., in which a specialized stylus is believed to be described for data input.

Data processing and network link requirements make voice recognition operation in such miniature cellphones largely impractical for the near term, so that some type of "keyboard" data input is required.

Fingertip key button operation is considered the most convenient data entry system. Thus, for user ergonomics and ease of use, providing keycaps of a size that is more visible and that makes fingertip depression of the desired keycap easy is a perceived benefit. It may also be beneficial to space the keycaps sufficiently so that accidental operation of an adjacent keybutton is infrequent.

A response to the need for a keyboard for use with a very small cellphone is described in U.S. Pat. No. 6,155,841 to Spanyar in which a film-layer based keyboard is described for sewn attachment to a nearby jacket sleeve.

U.S. Pat. No. 6,271,835 to Hoeksma is believed to describe a touch screen in which the displayed keybutton label and size is controlled by internal device electronics. Thus, the user may be provided with an optimized touch display customized on the forecast of "next keystroke needed."

There is believed to be a need to provide physical separation of cellphone microphone and earphone locations which approximates the several inch separation between mouth and ear of the user. Certain patents are believed to have proposed solutions which unfold a wrist band to provide a separation between earpiece and microphone. Among these patents are believed to be U.S. Pat. No. 5,008,964 to Yoshitake, U.S. Pat. No. 5,274,613 to Seager and U.S. Pat. No. 5,251,189 to Thorp. Alternately, a RF wireless link to a separate headphone unit may be provided, such as is believed to be described in U.S. Pat. No. 5,045,051 to Hoff.

For general purpose use of the cellphone, continually wearing a separate, linked headphone may not always be convenient. It may also be inconvenient if the user must wait to answer or initiate a cellphone call until the separate headphone unit is withdrawn from a storage location, power turned on, and then placed on the side of the head. As described below, deployment of the keyboard in an example embodiment of the present invention from storage compaction may provide the desired separation of microphone and earphone locations.

There exists at least two types, or instances, of constraints on keycap size when designing a micro cellphone keyboard. In the first instance, if the keycaps remain the same size between storage and use, then it may be favorable to make the size of the keycap as large as possible within the storage space available and then to create space between these fixed size keycaps as the device transitions between storage and use conditions. This may allow the user to easily differentiate between keycaps and may reduce mistaken keybutton depressions, since a fingertip may be about the same size as the top surface of the keycap. It may also permit a larger keycap "real estate" on which to put legends.

Letters that may be translated into dialing numbers are used when it is desirable for a person to quickly remember a number from a letter and number sequence than with a number sequence alone.

Thus, one may see plumbing trucks with signs that read, for example, "Call 1-800-TRYHARRY" since the owner feels that this may be a more memorable sequence when you want a plumber than "Call 1-800-879-4277" would be. A consequence of this is that one may need to be able to easily read the alphabetic legends near each number key on the micro cellphone in order to dial the number correctly.

Thus, keycaps may need to bear dual legends, such as a number plus groups of letters (1 and "ABC"; 2 and "DEF"; 3 and "GHI"; etc.). It may thus be favorable to make the letter groups written on the keycap tops, along with the numbers, as large as possible so that the user does not need a magnifying glass to visually select the desired character or number on a keycap.

It is also possible to "semi-stack" the keycap top plates during storage, much in the manner of roof tiles. The amount of tiled stacking available may be limited by the keybutton's switch actuator size compared to the overall keybutton top size. Note that this tiling arrangement may also add some extra height to the keyboard when in a storage position, and for really small micro cellphones, this may be an impractical tradeoff.

The second instance of micro cellphone keyboard design may utilize keybutton tops that change actual size between storage and use positions. Various arrangements of accomplishing keycap size change are described in U.S. Pat. No. 6,739,774 to Lahr, which is expressly incorporated herein in its entirety by reference thereto, and those arrangements of keycap expansion may be used herein. Note that if the keybutton physically expands, the presented legend on the keytop may also be caused to expand during the transition between storage size and final use size of the micro cellphone's keycap.

While this discussion has its principal focus on number dialing keyboards for micro cellphones, the same deployable keyboard technology may be used for somewhat larger keyboards, as on Personal Data Assistant devices (PDA's) or on "Smart Phones," which may have larger alphanumeric data entry keyboards.

Note that while single direction expansion (X-axis only), e.g., essentially in a single plane, may be used to provide more active keyboard area when the keyboard is deployed for use, it may be more favorable to employ both X- and Y-direction planar expansion.

While expanding a "surface mount" keyboard may be practical, for very tiny keyboard designs, it may be favorable to consider "drawer" type deployment for these very small devices. One or more "drawers" may be used to house the keyboard in its storage mode. When the drawers are extended, the keyboard is brought forth, and the keyboard may expand in at least the X- (width) dimension. Alternately, the deployed keyboard may expand in both the X- (width) and Y- (length) dimensions.

Certain aspects of the use of a pull-out drawer associated with wrist-carried communication devices or computer equipment are believed to be described in a number of U.S. patents.

For example, U.S. Pat. No. 5,224,076 to Thorp is believed to show a small telescoping "drawer like" section telescoping out from a wrist carried radio telephone (an earlier terminology), but the device's keyboard is not carried on the extending drawer sections. Rather, the extending drawer sections provide a physical distance between the microphone on the end of the drawer and the earphone unit mounted on the other side of the radio telephone, and the keyboard is mounted just beneath the display area and does not move or change size.

U.S. Pat. No. 5,037,163 to Hatcher is believed to describe a single drawer which slides out, as from under an existing computer table. A completely separate keyboard (standard layout) is placed upon this surface. Thus, when not in use, the drawer slides back under the computer table surface, but may be slid out when the computer was in use, so as to save computer desk top space. The action of the sliding parts is discussed therein.

U.S. Pat. No. 5,901,934 to Wilson is believed to describe a similar sliding "pull out" drawer, mounted under a computer table surface, but adds structure to the drawer that retracts and raises, as for instance, when the drawer is pulled out. A section of the drawer may remain flat to serve as a base for a mouse pad. The moving segment of the drawer may be used as a portion of the computer housing (or casing), if desired.

U.S. Pat. No. 6,454,369 to Cooper et al. is believed to describe a pullout drawer for mounting under a computer table. Cooper et al. add a front edge palm rest area near the zone where a keyboard will be placed, and facilitates the placement and movement of a cable (e.g., the usual keyboard to computer cable and presumably the mouse to computer cable as well).

U.S. Pat. No. 6,467,860 to Remmers is believed to describe a pullout drawer. But instead of a flat surface for mounting a keyboard (or mouse), the system houses a wire basket. The basket may be used for mounting other things, or, e.g., for storing or filing materials. The action of the sliding parts is discussed, with adaptations particularized for use with a wire basket "tray."

While it may be common to provide a slide out drawer for utility uses, as just below a computer table surface, micro cellphone pull out drawers hereof may utilize multiple extension drawers, where, for example, for a two drawer configuration, each "drawer" provides one half of desired keyboard keys. The whole keyboard may be presented only when both keyboard drawers are extended, one below the other.

In the case of the micro cellphone, the bottom of the main electronic chassis becomes the "computer table" beneath which telescoping slides are mounted, and the sliding thus takes place beneath the electronic chassis of the micro cellphone, e.g., one drawer beneath the other.

All keybuttons may be incorporated on the individual "drawers." "Legend space" may be provided adjacent to the keybutton mounting area for additional information labels referring to an individual keybutton.

In addition, in the last four patents discussed above, the drawer trays are provided for the latter placement of objects, such as complete keyboards or computer mice.

And, while some of these drawer device patents may have presented facilitating cable placement for keyboard-to-desktop computer or mouse-to-computer wires, according to an example embodiment of the present invention, wiring may be completely integral to the drawer assembly and may be arranged to never be handled by the user. Herein, flexible polyamide strips with etched copper circuitry may be fixedly mounted between keybutton switch area and a logic board of an associated micro cellphone. The flexible polyamide strips may fold and/or loop and be arranged to allow slide-in or slide-out of the drawers without breaking the circuit connection between the keybutton switches and the micro cellphone logic board.

SUMMARY

In accordance with an example embodiment of the present invention, a keyboard may be deployed from a compact planar stored shape or position to a larger planar shape for data entry use. If an elastic surface is used to control expansion (X- or Y-axes, or both), that elastic surface may include, e.g., a fabric, an elastomer or a combination of the two, etc. When deployed, the keybutton top surfaces move apart from each other.

According to an example embodiment of the present invention, a keyboard adapted for use in connection with an electronic device, e.g., a telephone, a cellphone, a micro cellphone, a handheld electronic device, a personal digital assistant (PDA), a palm-top computer, a smartphone, a wireless or cordless telephone, etc., includes: a fabric elastically stretchable in a substantially single plane in at least one direction between an expanded position and a contracted position; and a plurality of keycaps arranged on the fabric, each keycap corresponding to a respective key button of the electronic device, a spacing between adjacent keycaps in the at least one direction expandable and contractible in accordance with and proportional to expansion and contraction of the fabric between the expanded position of the fabric and the contracted position of the fabric. The fabric in the contracted position is arranged to be substantially entirely received in a housing of the electronic device.

Each keycap may include an indication of a corresponding numeral.

Each keycap may include an indication of at least one corresponding alphanumeric character.

The keyboard may include a frame including substantially rigid elements extendable and contractible in the at least one direction.

The substantially rigid elements may include a plurality of rigid elements configured to telescope in the at least one direction, e.g., the rigid elements may be nested one inside another.

The substantially rigid elements may include a plurality of drawer elements, which may be configured to be received in the housing of the electronic device in a storage position and which may be extendable from the housing of the electronic device into a keyboard data entry position.

The rigid elements may be substantially tubular or may have other cross-sectional shapes, e.g., square, rectangular, polygonal, etc.

The keyboard may include at least one substantially rigid panel arranged on a side of the fabric opposite the keycaps.

The keyboard may include a plurality of substantially rigid panels arranged on a side of the fabric opposite the keycaps. The panels may be configured to be stacked in the contracted position of the fabric, and the panels may be movable relative to each other in the at least one direction in accordance with expansion and contraction of the fabric between the expanded position of the fabric and the contracted position of the fabric.

The fabric may be elastically stretchable in the substantially single plane in two perpendicular directions.

The keyboard may include a connection layer arranged on a side of the fabric opposite the keycaps.

The keycaps may be elastically expandable and contractible in the at least one direction in accordance with and proportional to expansion and contraction of the fabric.

The keyboard may include further features, which are more fully described below.

According to an example embodiment of the present invention, an electronic device includes a housing and a keyboard. The keyboard includes: a fabric elastically stretchable in a substantially single plane in at least one direction between an expanded position and a contracted position; and a plurality of keycaps arranged on the fabric, each keycap corresponding to a respective keybutton of the electronic device, a spacing between adjacent keycaps in the at least one direction expandable and contractible in accordance with and proportional to expansion and contraction of the fabric between the expanded position of the fabric and the contracted position of the fabric. The fabric in the contracted position is arranged to be substantially entirely received in the housing.

The keyboard of the electronic device may include any one or more of the features indicated above or those more fully described below.

The electronic device may include an ambient light sensor and a light configured to illuminate the keycaps in the expanded position of the fabric based on an ambient light level determined by the ambient light sensor.

The electronic device may be configured as a wireless telephone.

According to an example embodiment of the present invention, an electronic device includes a housing and a keyboard. The keyboard includes: a fabric elastically stretchable in a substantially single plane in at least one direction between an expanded position and a contracted position; and a plurality of keycaps arranged on the fabric, each keycap corresponding to a respective keybutton of the electronic device, a spacing between adjacent keycaps in the at least one direction expandable and contractible in accordance with and proportional to expansion and contraction of the fabric between the expanded position of the fabric and the contracted position of the fabric. The fabric in the contracted position has a width and a length in the substantially single plane not greater than a width and a length of the housing.

The keyboard of the electronic device may include any one or more of the features indicated above or those more fully described below.

Further features and aspects of example embodiments of the present invention are described below and illustrated in the appended Figures.

BRIEF DESCRIPTION OF THE DRAWINGS

FIG. 6 illustrates frame and support panels for a micro cellphone keyboard during storage and progressive opening.

FIGS. 7A, 7B and 7C illustrate a planar micro cellphone in which a keyboard thereof is always visible but may stretch out for communication use.

DETAILED DESCRIPTION

Figure 1A:
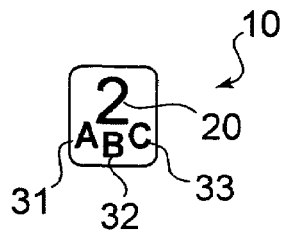
FIGS. 1A, 1B, 1C and 1D are front views of micro cellphone keybutton tops or keycaps.

Referring to FIGS. 1A, 1B, 1C and 1D, micro cellphone dialing keybutton tops or keycaps are illustrated. In FIG. 1A, 10 represents the keycap, with numeric legend 20 inscribed on it, here the legend being the numeral 2. Also inscribed on the keycap 10 are the alphabetic legends 31, 32, and 33 (e.g., "A," "B," and "C," respectively). It should be understood that any number of alphanumeric legends may be inscribed.

Figure 1B:
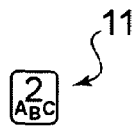

In FIG. 1B, the keycap is illustrated approximately actual size as keycap 11.

Figure 1C:
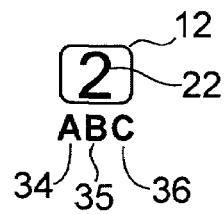

In FIG. 1C, only the numeric legend 22 is inscribed on keycap 12, and alphabetic legends 34, 35, and 36 are inscribed on stretched material which surrounds the keycap 12.

Figure 1D:
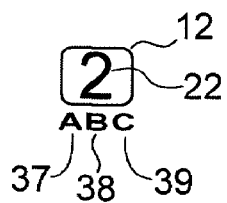

In FIG. 1D, the stretched material is vertically relaxed for storage, so the alphabetic legends 37, 38, and 39 shrink in vertical size. Note that the inscribed numeric legend 22 remains the same size as in FIG. 1C.

Figure 2A:
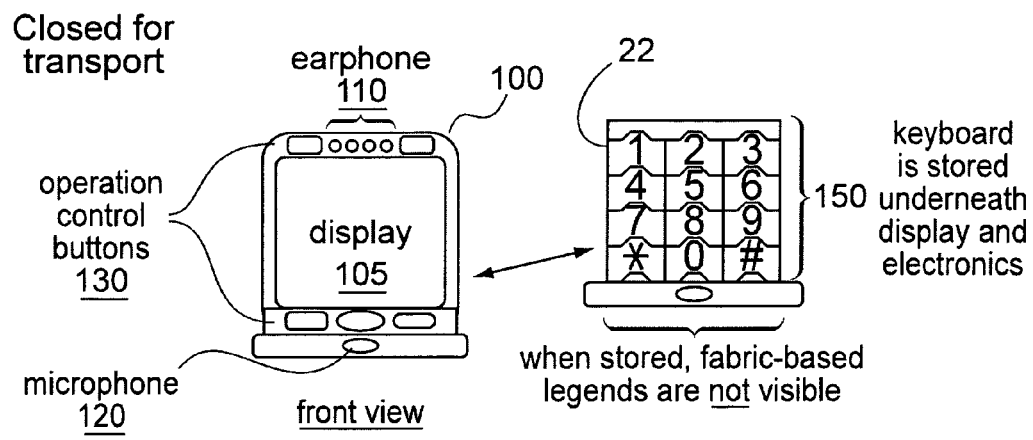
FIGS. 2A and 2B are closed and open views, respectively, of a micro cellphone keyboard which may entirely disappear from view during storage or transport.
Figure 2B:
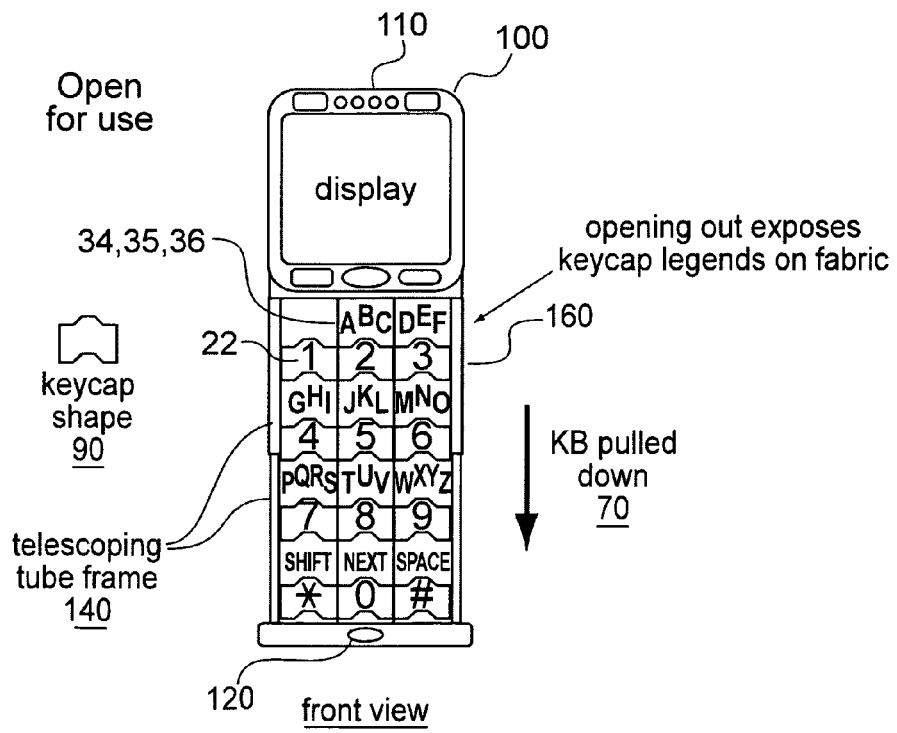

Referring to FIGS. 2A and 2B, keyboard operation of a micro cellphone is illustrated.

In FIG. 2A, the keyboard is closed for storage or transport. The most prominent device feature remaining is the case 100 and display 105 in its center. At the top of the case 100, the aperture containing the earphone 110 is visible. The bottom of case 100, the aperture containing the microphone 120 is visible. The operational controls (e.g., buttons) 130 are illustrated at the periphery of the case 100. The keyboard 150 is not visible, since it is stored underneath the case 100. If the device were taken apart, only the numeric legends 22 would be visible on the stored keyboard 150, since the alphabetic legends (e.g., 34, 35, 36 in FIG. 2B) are hidden by the keycaps 90 (see FIG. 2B).

In FIG. 2B, the micro cellphone is opened for use, e.g., by pulling the telescoping tube frame downwardly. The keyboard 160 is completely extended downwardly, and the alphabetic legends 34, 35, 46 appear just atop the keybuttons 90 which have the numeric legends 22 inscribed thereon.

Referring to FIGS. 3A, 3B, 3C and 3D, a two drawer structure for a micro cellphone keyboard is illustrated.

Figure 3A:
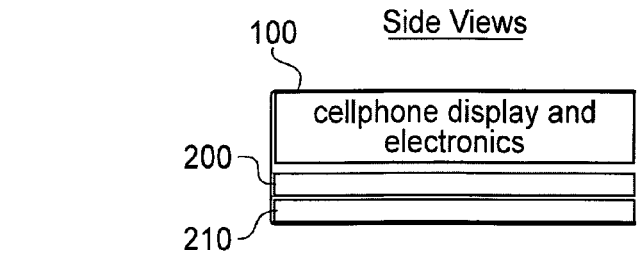
FIGS. 3A, 3B, 3C and 3D illustrate a two drawer structure for housing a micro cellphone keyboard so that it may disappear from view during storage or transport.
Figure 3B:
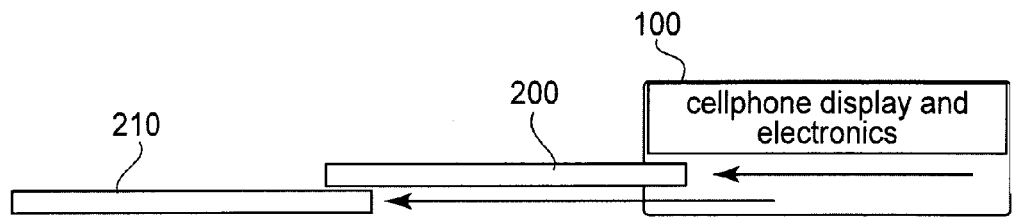
Figure 3C:
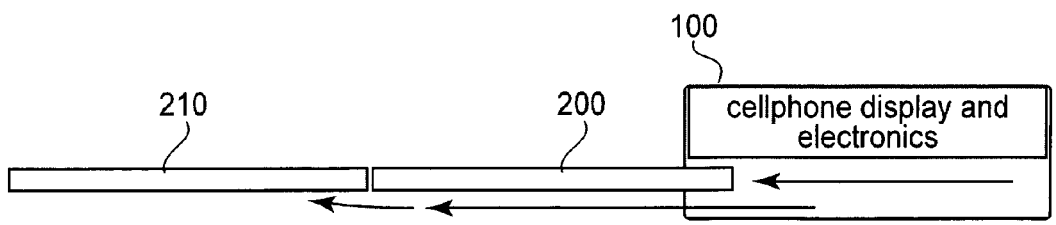

In FIG. 3A, the two keyboard drawers 200 (upper) and 210 (lower) are stored within the base of case 100. In FIG. 3B, both drawer 200 and 210 are fully extended, and present a "stair step" configuration as illustrated. In FIG. 3C, both drawers 200 and 210 are again fully extended, but the support harness positions drawer 210 at the same level as drawer 200, so as to form a flat surface, level with the bottom surface of the case 100.

Figure 3D:
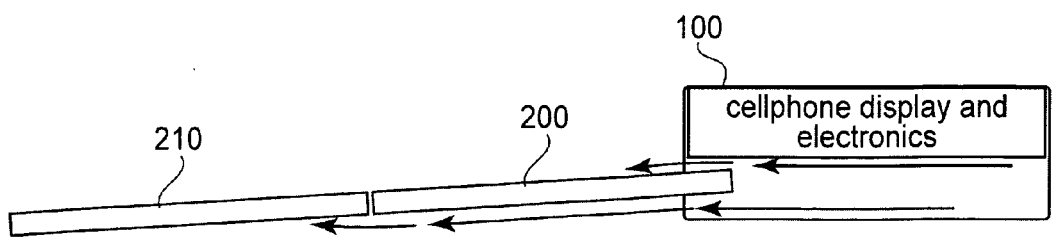

In FIG. 3D, the drawers 200 and 210 are again fully extended outwardly from the case 100, but are arranged to form a flat surface angled with respect to the bottom of cellphone case 100. This angular positioning may be desirable if the micro cellphone is worn on the wrist while dialing phone numbers, rather than being detached from the wrist.

Figure 4:
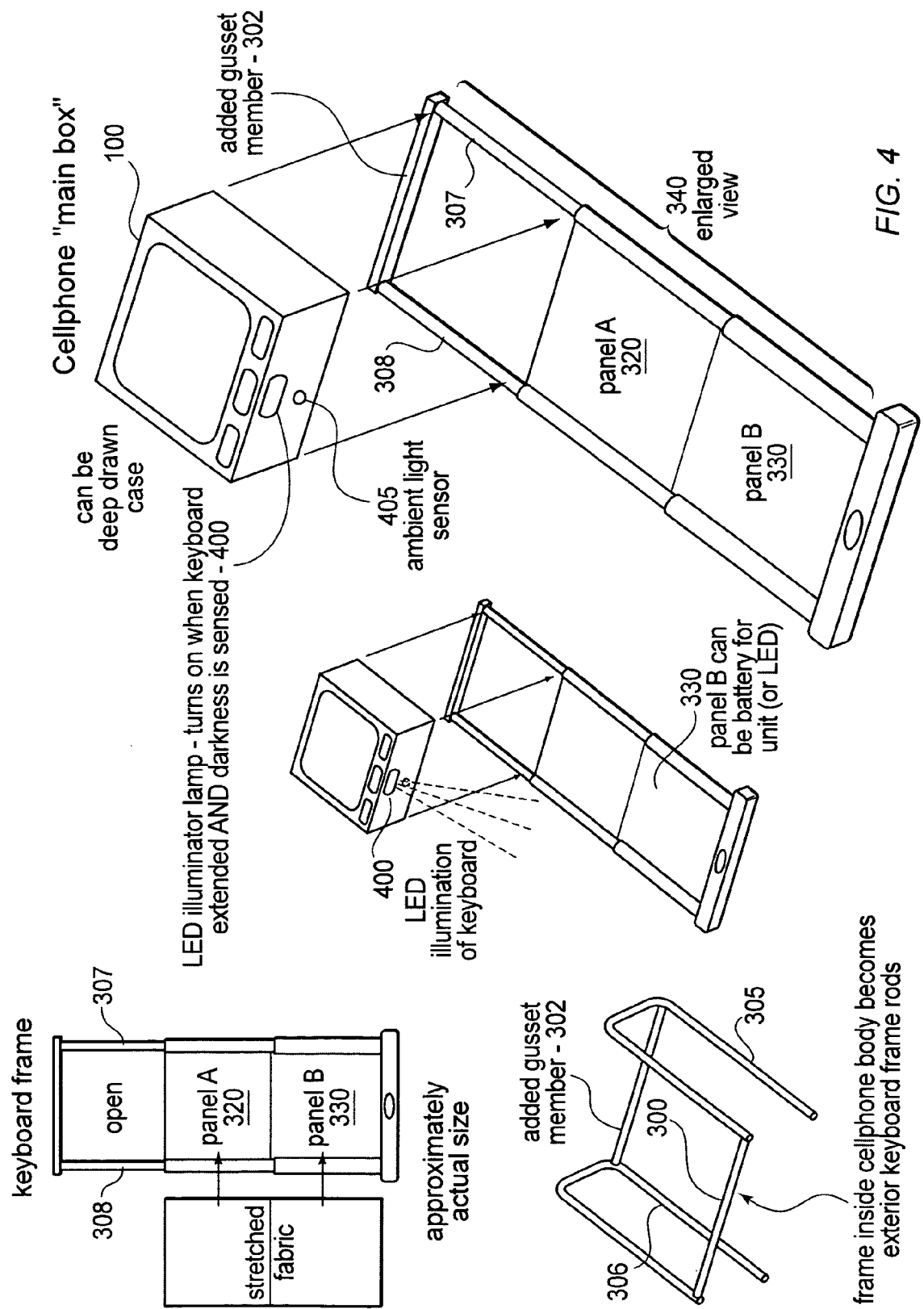
FIG. 4 illustrates a micro cellphone "main box" for display and electronics and an associated keyboard frame.

Referring to FIG. 4, the micro cellphone "main box" case 100 is illustrated. The bent frame 300 is arranged to support the base 100, and the frame 300 has side legs 305 and 306. Added gusset member 302 is placed at the ends of bent frame 300, arranged as a cross support between legs 305 and 306. Note that leg 305 joins to telescoping tube 307 of sliding panel frame 340, and leg 306 joins to telescoping tube 308. Sliding panel A is 320 and sliding panel B is 330 and include cooperating parts of sliding panel frame 340.

At the upper right, note that an illumination LED 400 is provided on the side of the case 100 that faces the sliding panel frame 340. Just below LED 400 is ambient light sensor 405, which is connected to a power circuit when the keyboard 160 is extended fully outwardly. If the ambient light level is low, the sensor 405 operates to apply power to the LED 400, so that the keyboard surface 320 and 330 are illuminated for user convenience.

Figure 5:
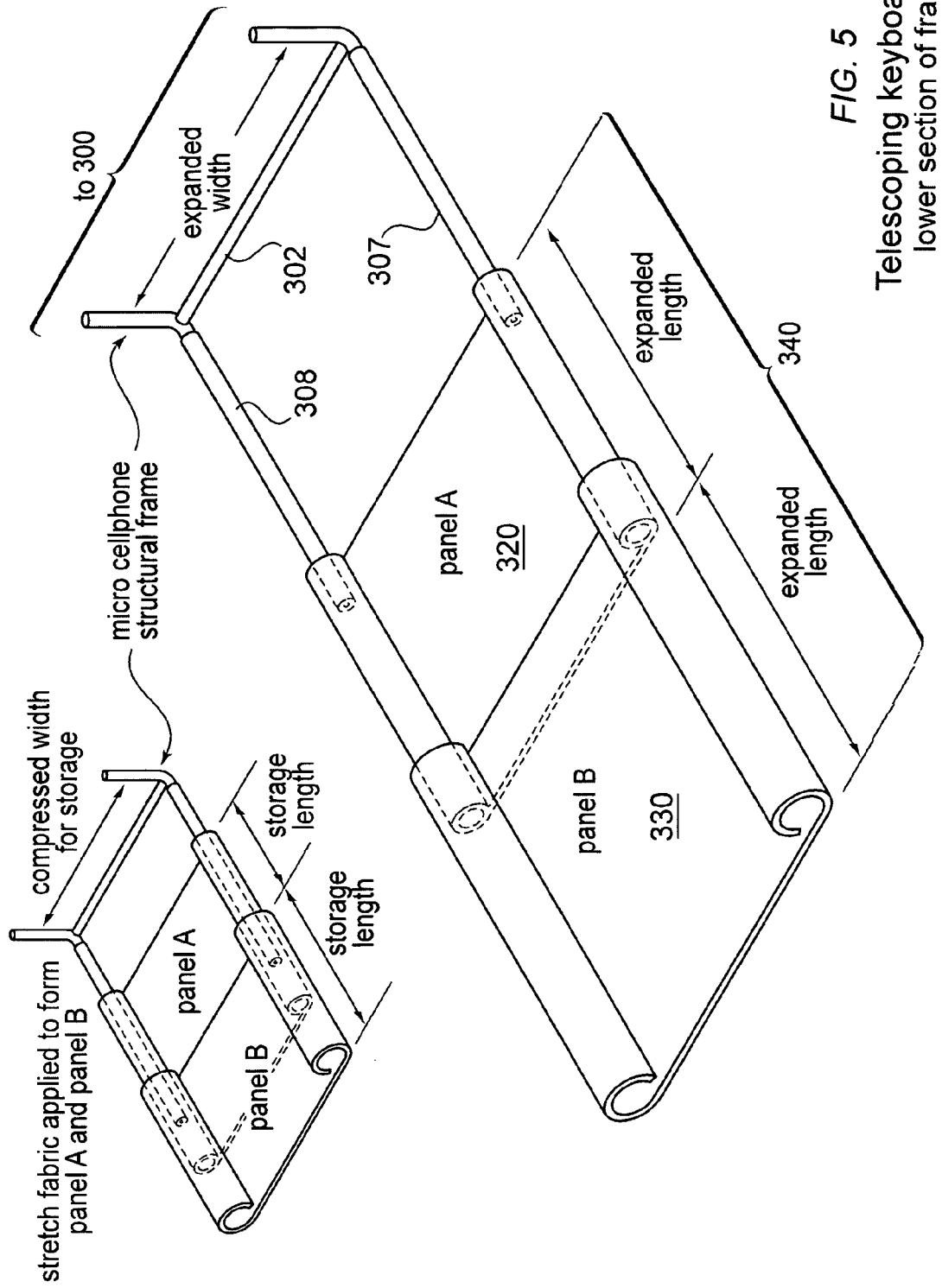
FIG. 5 is a detailed view of a telescoping keyboard frame arranged to support a micro cellphone keyboard.

Referring to FIG. 5, a more detailed view of the telescoping tube frame is provided. At upper left, the frame is nearly closed for storage within the micro cellphone body (case 100). At lower right, the panel A 320 and panel B 330 are slid outwardly to form the extended keyboard base 340.

Referring to FIG. 6, at upper left, the keyboard 70 is illustrated as having been stored wholly within case 100 of the micro cellphone. The first drawing below the upper left illustrates a construction of the telescoping tubes 340 in compressed position. Just below that view is another view illustrating the attachment of an unstretched fabric on the compressed frame formed by telescoping tubes 340.

Immediately to the right is a "half open" illustration of the telescoping tubes as they are being extended, and then another illustration at the right illustrating the fully exposed panel A 320 and the panel B 330.

To the far right of FIG. 6 is an illustration showing the fabric 570 which is stretched by the full extension of telescoping tubes 340.

At lower right of FIG. 6 is an illustration showing the fully extended keyboard 70, complete with the alphanumeric legends 22 and alphabetic legends 34, 35 and 36 inscribed to aid the user in dialing the micro cellphone.

FIGS. 7A, 7B and 7C illustrate a stretch keyboard for use is on a micro cellphone, but in a manner that keeps the keyboard surface 80 always visible.

In FIG. 7A, note that only numeric legends 22 are illustrated on keyboard surface 80 for clarity. Note also that antenna 90 is shown extended and that for many high frequency micro cellphones, such a protruding wire antenna 90 may not be necessary (only a stub antenna may be provided). Earphone openings 110 are illustrated at the top of the micro cellphone 600, and microphone openings 120 at the bottom of micro cellphone 600. The display surface 105 is located at the top end of the cellphone 600, and the operational controls 70 are located just below the display surface 105.

In FIG. 7B, the keyboard surface 680 is illustrated as having been stretched out horizontally to form laterally stretched keyboard surface 684. Since the keybuttons do not expand, this creates space between the keycap columns so that the keycaps are easier to push and mistaken button pushing (or confusion) may be markedly less likely.

In FIG. 7C, the keyboard surface 680 is illustrated as having been stretched out horizontally and vertically to form entirely stretched keyboard surface 686. This added vertical stretching may allow for increased room between the key rows, which may further reduce mistake in button pushing and may increase operator convenience. Since the operator controls may be used less frequently than the numeric keycaps, the operator controls remain the same size and spacing when the keyboard surface 680 expands (as to laterally increased size 684 or fully expanded surface 686).

Reference Characters Used
- 10 keybutton cap (enlarged view)
- 11 keybutton cap (actual size)
- 12 keybutton cap mounted on stretchable material
- 20 numeric keycap legend (enlarged view)
- 22 numeric keycap legend on solid keycap
- 31 alphabetic legend, here "A" (enlarged view)
- 32 alphabetic legend, here "B" (enlarged view)
- 33 alphabetic legend, here "C" (enlarged view)
- 34 alphabetic legend, here "A" (inscribed on stretched material)
- 35 alphabetic legend, here "B" (inscribed on stretched material)
- 36 alphabetic legend, here "C" (inscribed on stretched material)
- 37 alphabetic legend, here "A" (inscribed on stretched material, now relaxed)
- 38 alphabetic legend, here "B" (inscribed on stretched material, now relaxed)
- 39 alphabetic legend, here"C" (inscribed on stretched material, now relaxed)
- 70 keyboard, pulled down from storage
- 90 keycap shape
- 100 micro cellphone case
- 105 micro cellphone display
- 110 micro cellphone earphone
- 120 micro cellphone microphone
- 130 micro cellphone operational controls
- 140 telescoping tube frame
- 150 micro cellphone keyboard as stored (reduced dimensions)
- 160 telescoping tube frame extended (keyboard "open")
- 200 keyboard drawer (upper)
- 210 keyboard drawer (lower)
- 300 micro cellphone body frame
- 302 body frame gusset bar 305 body frame horizontal bar (right side)
306 body frame horizontal bar (left side)
307 telescoping tube frame right side end (joins to 305)
308 telescoping tube frame left side end (joins to 306)
320 Panel A of keyboard structure (portion of drawer 200)
330 Panel B of keyboard structure (portion of drawer 210)
340 extended telescoping frame structure
400 LED illuminator lamp
405 ambient light sensor
520 rolled tube edge and Panel B structure
530 C-tube edge and Panel A structure
550 domed keybuttons (gives tactile feel upon depression)
560 support rod portion of telescoping structure 340
570 stretched material (as fabric)
600 micro cellphone with keyboard that is always visible
680 micro cellphone with keyboard in compacted size
684 micro cellphone with keyboard in horizontally stretched size
686 micro cellphone with keyboard in horizontally and vertically stretched size
690 antenna for micro cellphone

What is claimed is:

1. A keyboard adapted for use in connection with an electronic device, comprising:
    a fabric elastically stretchable in a substantially single plane in at least one direction between an expanded position and a contracted position; and
    a plurality of keycaps arranged on the fabric, each keycap corresponding to a respective key of the electronic device, a spacing between adjacent keycaps in the at least one direction expandable and contractible in accordance with and proportional to expansion and contraction of the fabric between the expanded position of the fabric and the contracted position of the fabric;
    wherein the fabric in the contracted position is arranged to be substantially entirely received in a housing of the electronic device.

2. The keyboard according to claim 1, wherein each keycap includes an indication of a corresponding numeral.

3. The keyboard according to claim 1, wherein each keycap includes an indication of at least one corresponding alphanumeric character.

4. The keyboard according to claim 1, further comprising a frame including substantially rigid elements extendable and contractible in the at least one direction.

5. The keyboard according to claim 4, wherein the substantially rigid elements include a plurality of rigid elements configured to telescope in the at least one direction.

6. The keyboard according to claim 4, wherein the substantially rigid elements include a plurality of drawer elements, the drawer elements configured to be received in the housing of the electronic device in a storage position and extendable from the housing of the electronic device into a keyboard data entry position.

7. The keyboard according to claim 5, wherein the rigid elements are substantially tubular.

8. The keyboard according to claim 1, further comprising at least one substantially rigid panel arranged on a side of the fabric opposite the keycaps.

9. The keyboard according to claim 1, further comprising a plurality of substantially rigid panels arranged on a side of the fabric opposite the keycaps, the panels configured to be stacked in the contracted position of the fabric, the panels movable relative to each other in the at least one direction in accordance with expansion and contraction of the fabric between the expanded position of the fabric and the contracted position of the fabric.

10. The keyboard according to claim 1, wherein the fabric is elastically stretchable in the substantially single plane in two perpendicular directions.

11. The keyboard according to claim 1, further comprising a connection layer arranged on a side of the fabric opposite the keycaps.

12. The keyboard according to claim 1, wherein the keycaps are elastically expandable and contractible in the at least one direction in accordance with and proportional to expansion and contraction of the fabric.

13. An electronic device, comprising:
    a housing; and
    a keyboard including:
        a fabric elastically stretchable in a substantially single plane in at least one direction between an expanded position and a contracted position; and
        a plurality of keycaps arranged on the fabric, each keycap corresponding to a respective key of the electronic device, a spacing between adjacent keycaps in the at least one direction expandable and contractible in accordance with and proportional to expansion and contraction of the fabric between the expanded position of the fabric and the contracted position of the fabric;
    wherein the fabric in the contracted position is arranged to be substantially entirely received in the housing.

14. The electronic device according to claim 13, wherein the fabric is elastically stretchable in the substantially single plane in two perpendicular directions.

15. The electronic device according to claim 13, further comprising an ambient light sensor and a light configured to illuminate the keycaps in the expanded position of the fabric based on an ambient light level determined by the ambient light sensor.

16. The electronic device according to claim 13, wherein each keycap includes an indication of a corresponding numeral.

17. The electronic device according to claim 13, wherein each keycap includes an indication of at least one corresponding alphanumeric character.

18. The electronic device according to claim 13, further comprising a frame including substantially rigid elements extendable and contractible in the at least one direction.

19. The electronic device according to claim 18, wherein the substantially rigid elements include a plurality of rigid elements configured to telescope in the at least one direction.

20. The electronic device according to claim 18, wherein the substantially rigid elements include a plurality of drawer elements, the drawer elements configured to be received in the housing in a storage position and extendable from the housing into a keyboard entry position.

21. The electronic device according to claim 19, wherein the rigid elements are substantially tubular.

22. The electronic device according to claim 13, further comprising at least one substantially rigid panel arranged on a side of the fabric opposite the keycaps.

23. The electronic device according to claim 13, further comprising a plurality of substantially rigid panels arranged on a side of the fabric opposite the keycaps, the panels configured to be stacked in the contracted position of the fabric, the panels movable relative to each other in the at least one direction in accordance with expansion and contraction of the fabric between the expanded position of the fabric and the contracted position of the fabric.

24. The electronic device according to claim 13, wherein the fabric is elastically stretchable in the substantially single plane in two perpendicular directions.

25. The electronic device according to claim 13, further comprising a connection layer arranged on a side of the fabric opposite the keycaps.

26. The electronic device according to claim 13, wherein the electronic device is configured as a wireless telephone.

27. The electronic device according to claim 13, wherein the keycaps are elastically expandable and contractible in the at least one direction in accordance with and proportional to expansion and contraction of the fabric.

28. An electronic device, comprising:
   a housing; and
   a keyboard including:
      a fabric elastically stretchable in a substantially single plane in at least one direction between an expanded position and a contracted position; and
      a plurality of keycaps arranged on the fabric, each keycap corresponding to a respective key of the electronic device, a spacing between adjacent keycaps in the at least one direction expandable and contractible in accordance with and proportional to expansion and contraction of the fabric between the expanded position of the fabric and the contracted position of the fabric;

wherein the fabric in the contracted position has a width and a length in the substantially single plane not greater than a width and a length of the housing.

* * * * *